US006658250B1

(12) United States Patent
Ganesan et al.

(10) Patent No.: US 6,658,250 B1
(45) Date of Patent: Dec. 2, 2003

(54) SYSTEM AND METHOD FOR A WIDE AREA WIRELESS PERSONAL COMMUNICATION SYSTEM INCORPORATING ADVANCED MESSAGING

(75) Inventors: Kalyan Ganesan, Germantown, MD (US); Enrique Laborde, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1451 days.

(21) Appl. No.: 08/583,357

(22) Filed: Jan. 5, 1996

(51) Int. Cl.[7] .................................................. H04Q 7/20
(52) U.S. Cl. .................... 455/426.01; 340/7.1; 455/458
(58) Field of Search .......................... 455/38.1, 74, 89, 455/90, 503, 526; 379/56–57, 58, 59; 370/335, 342, 320; H04Q 7/20

(56) References Cited

U.S. PATENT DOCUMENTS

| | | | | |
|---|---|---|---|---|
| 4,506,384 A | * | 3/1985 | Lucas .......................... 455/51 |
| 4,748,655 A | * | 5/1988 | Thrower et al. ............... 379/60 |
| 5,301,359 A | * | 4/1994 | Van Den Heuvel et al. ........................ 455/56.1 |
| 5,315,636 A | | 5/1994 | Patel |
| 5,406,629 A | * | 4/1995 | Harrison et al. ............... 380/34 |
| 5,432,841 A | * | 7/1995 | Rimer .......................... 379/59 |
| 5,463,672 A | * | 10/1995 | Kage ............................ 379/59 |
| 5,475,677 A | * | 12/1995 | Arnold et al. ................ 370/29 |
| 5,485,163 A | * | 1/1996 | Singer et al. ............... 342/457 |
| 5,504,803 A | * | 4/1996 | Yamada et al. ............... 379/59 |
| 5,511,072 A | * | 4/1996 | Delprat ...................... 370/68.1 |
| 5,513,243 A | * | 4/1996 | Kage ............................ 379/58 |
| 5,526,398 A | * | 6/1996 | Okada et al. ................ 379/57 |
| 5,539,392 A | * | 7/1996 | Hays et al. ............. 340/825.44 |
| 5,574,771 A | * | 11/1996 | Driessen et al. .............. 379/57 |
| 5,577,264 A | * | 11/1996 | Tuohino .................... 455/33.2 |
| 5,613,199 A | * | 3/1997 | Yahagi ...................... 455/33.1 |

OTHER PUBLICATIONS

Jan. 1993 Sales Proposal from Hughes Network Systems to NYNEX/New England.

* cited by examiner

*Primary Examiner*—Vincent Boccio
(74) *Attorney, Agent, or Firm*—John T. Whelan; Michael Sales

(57) ABSTRACT

A system and method for integrating advanced messaging capabilities in a wide area wireless personal communications system is provided. The system includes personal transceiver units capable of communicating with one or more of a plurality of long range pagers. The transceiver and long range pager use existing frequencies and formats of the wireless personal communications system. The method provides for registering a personal transceiver in a two way messaging service area of the wireless personal communications system.

18 Claims, 12 Drawing Sheets

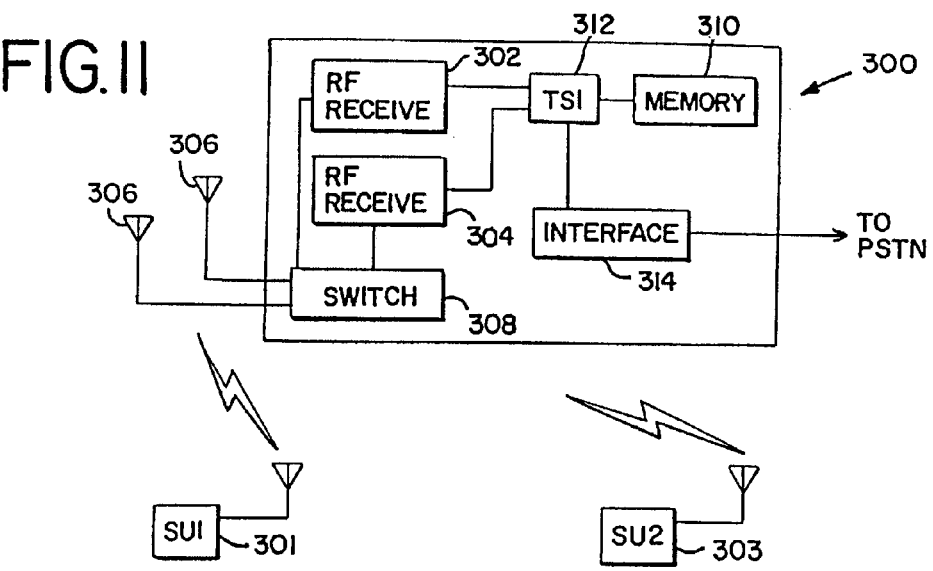
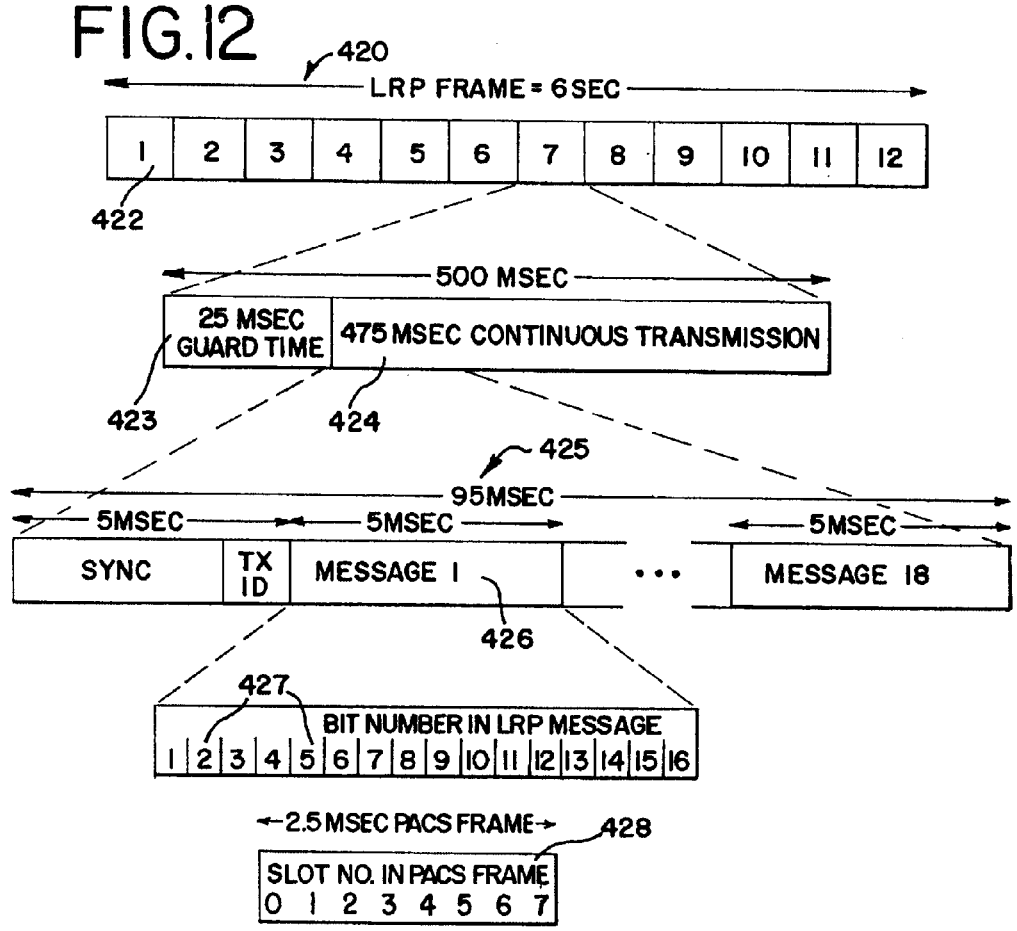

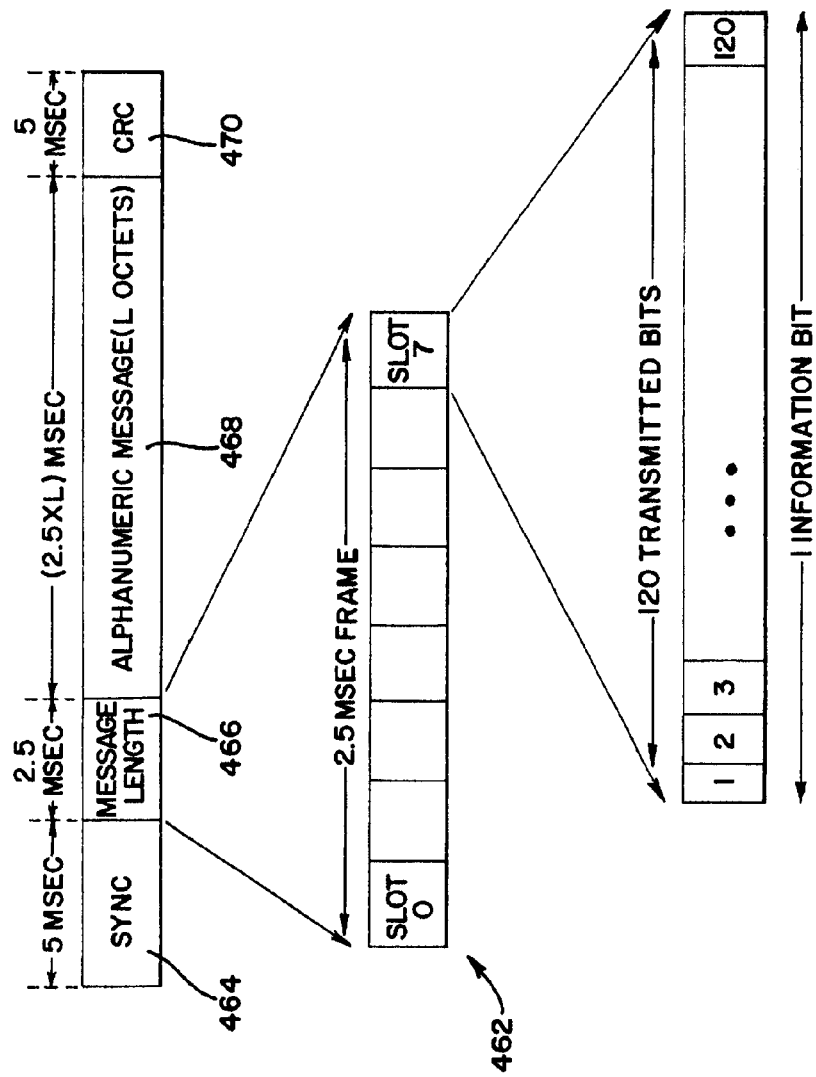

SYSTEM AND METHOD FOR A WIDE AREA WIRELESS PERSONAL COMMUNICATION SYSTEM INCORPORATING ADVANCED MESSAGING

BACKGROUND OF THE INVENTION

The present invention relates to a system and method incorporating advanced messaging in a wide area wireless personal communication system.

Wireless personal communication systems have varying voice communication ranges. When a user is outside the voice range of the system, calls directed to the user in that wireless personal communication system have nowhere to go and often end in an answering machine or other answering service. Because of the modern day need to be both accessible and mobile, many people carry pagers that operate in a system separate from their wireless or cellular service. The pager allows these users to keep apprised of all calls while outside the voice communications range of the wireless system. Pagers, however, typically only permit communication in one direction so that the user has no means for interacting with the caller or controlling the disposition of the call. Having to use a separate pager involves extra hardware that a person must carry at all times and, at the provider end, requires a separate network of communication facilities.

Currently, there is a need for a system and method for a wide area wireless personal communication system incorporating advanced messaging without the need for separate pagers and completely autonomous paging or messaging systems. Further, there is a need for an advanced messaging system that is integrated with a wireless network and requires a minimum of separate or additional communication lines or specialized equipment to be utilized by a wireless communication system provider. Additionally, a system and method for providing advanced messaging services in existing wireless personal communication systems would be desirable.

SUMMARY OF THE INVENTION

The present invention provides a system and method for providing advanced messaging services in a wide area wireless personal communication system. According to a first aspect of the invention, the system is a system for paging a user in an existing wireless personal communication system including a portable personal transceiver unit which is adapted to receive and transmit voice and data information in addition to receiving and responding to paging signals. The portable transceiver unit receives paging signals and responds to paging signals through at least one long range pager. Preferably, the two way messaging capability is integrated into existing wireless communication system protocols and frequency schemes so that the long range pager and personal transceiver unit may utilize existing electronic hardware.

According to another aspect of the present invention, a method of registering a personal transceiver unit in a two way messaging service area of a wireless personal communications system is provided. A personal transceiver unit monitors broadcasts from transceivers in a voice service area. If no transceivers in the voice service area are detected, the personal transceiver tunes to a predetermined paging frequency. The personal transceiver next acquires a long range pager signal and registers its location with the wireless communications system via the long range pager.

The invention itself, together with further attendant advantages, will best be understood by reference to the following detailed description, taken in conjunction with the accompanying drawings.

BRIEF DESCRIPTION OF THE DRAWINGS

FIG. 11 is a block diagram of a hybrid radio port/radio port controller.

FIG. 12 is an illustration of a preferred long range pager message format.

FIG. 16 is an illustration of a preferred return path message transmission format.

DETAILED DESCRIPTION OF THE PRESENTLY PREFERRED EMBODIMENTS

Figure 1:
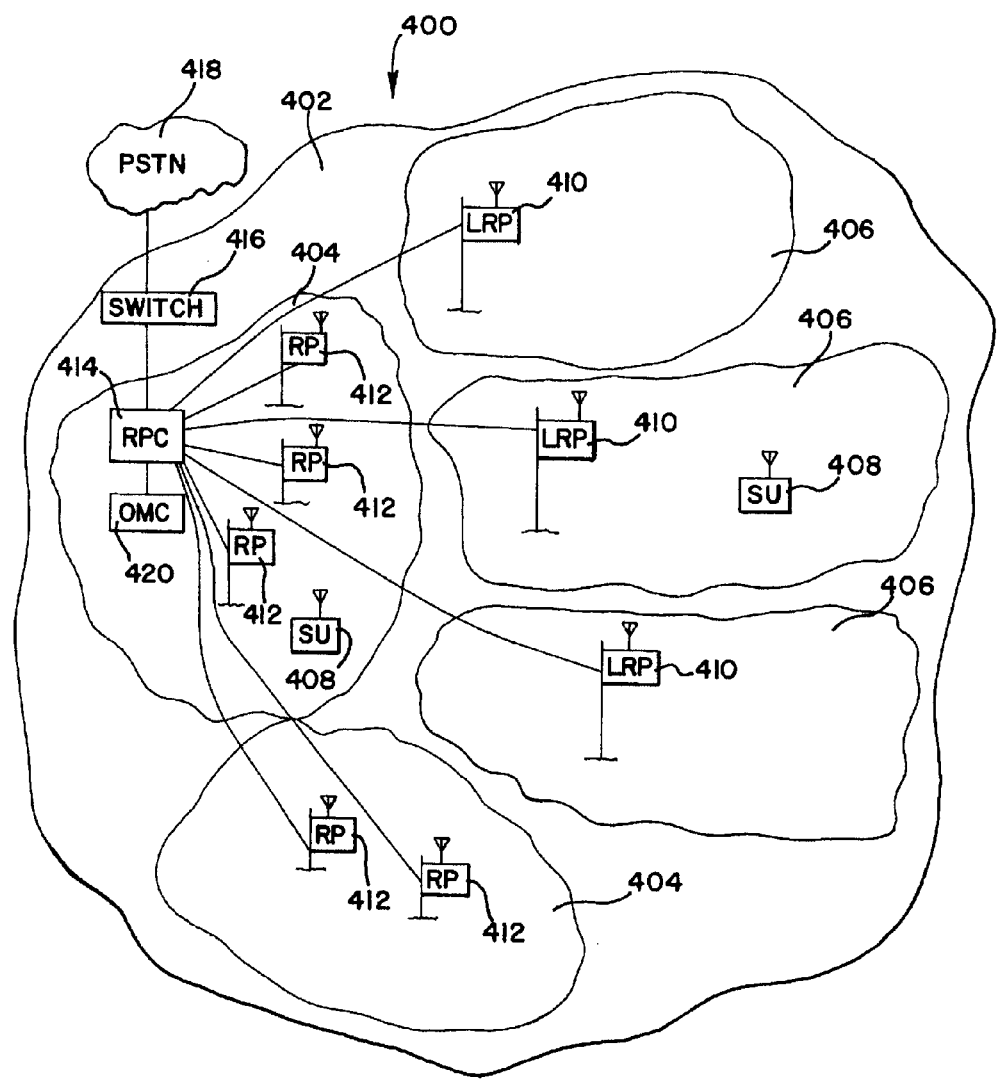
FIG. 1 is a block diagram of a preferred integrated wireless voice and paging system according to the present invention.

Referring to FIG. 1, a preferred two way messaging system 400 of the present invention is shown. The network coverage area 402 for the wide area wireless personal communication system 400 includes one or more voice service areas 404 and one or more two way messaging service areas 406. A "wide area" wireless personal communication system, as the phrase is used in this description, refers to a wireless personal communication system having a general communication range covering a greater geographical area than the voice communication range. For example, a preferred wide area system may offer voice communications for a city and offer advanced two-way messaging services over a larger regional area.

Each user in the system 400 of FIG. 1 preferably has a personal transceiver unit 408 capable of communicating with one or more of a plurality of long range pagers (LRPs) 410 or fixed transceiver units 412 in the system 400. In one preferred embodiment, the system is based on a personal access communications system (PACS) such that the personal transceiver units 408 are subscriber units (SUs) and the fixed transceiver units 410 are radio ports (RPs). The PACS-based network may include a radio port controller (RPC) 414 that manages the RPs 412 and LRPs 410. The RPC 414 communicates with a switch 416 that switches calls between the system 400 and other networks such as the public switched telephone network (PSTN) 418.

As background for the present invention, reference is made to FIGS. 2–11 to illustrate one wireless personal communication services (WPCS) environment in which the system and method of the present invention may operate. A typical architecture for a wireless PCS system includes subscriber units (SUs), radio ports (RPs), one or more radio port controllers (RPCs), and an access manager (AM). The SUs transmit information to the RPs using radio frequencies. RPs are small devices typically mounted to existing utility poles. The RPs are connected to an RPC using wireline facilities. Each RPC is connected to a switch that is part of the public switched telephone network (PSTN) and the AM. The AM provides overall coordination of the call handoff across RPCs, has the function of mobility management, and supports subscriber related features such as registration and authentication.

A consortium of telecommunication entities has recently developed a proposed standard for providing WACS PCS. This standard outlines the above-mentioned architecture. Further details concerning this proposed standard are set out in Bellcore Corp. publication TR-INS-001313 entitled Generic Criteria for Version 0.1 Wireless Access Communications Systems (WACS) published October 1993 (herein sometimes referred to as the specification). The publication is available to those interested in WACS PCS from Bellcore Corp. at Bellcore, Customer Services, 8 Corporate Place-Room 3C-183, Piscataway, N.J. 08854-4156, or at 1 (800) 521-CORP. Also, the reader may refer to Bellcore manual SR-ARH-002315 describing specific modulator and demodulator requirements in the SU and the RP.

Additionally, the U.S. Telecommunications Industry Association (TIA) has recently approved a PACS standard known as PACS Air Interface Standard J-STD-014. Generally, the WACS standard calls for 2 millisecond transmission frames containing 100 bits of information (64 message bits) transmitted at 400 kilobits per second (kbps). The format for the PACS standard is 2.5 millisecond frames containing 120 bits of information (80 message bits) transmitted at 384 kbps. The reader is presumed to be familiar with these standards and with related technological issues known to those having ordinary skill in the art.

Figure 2:
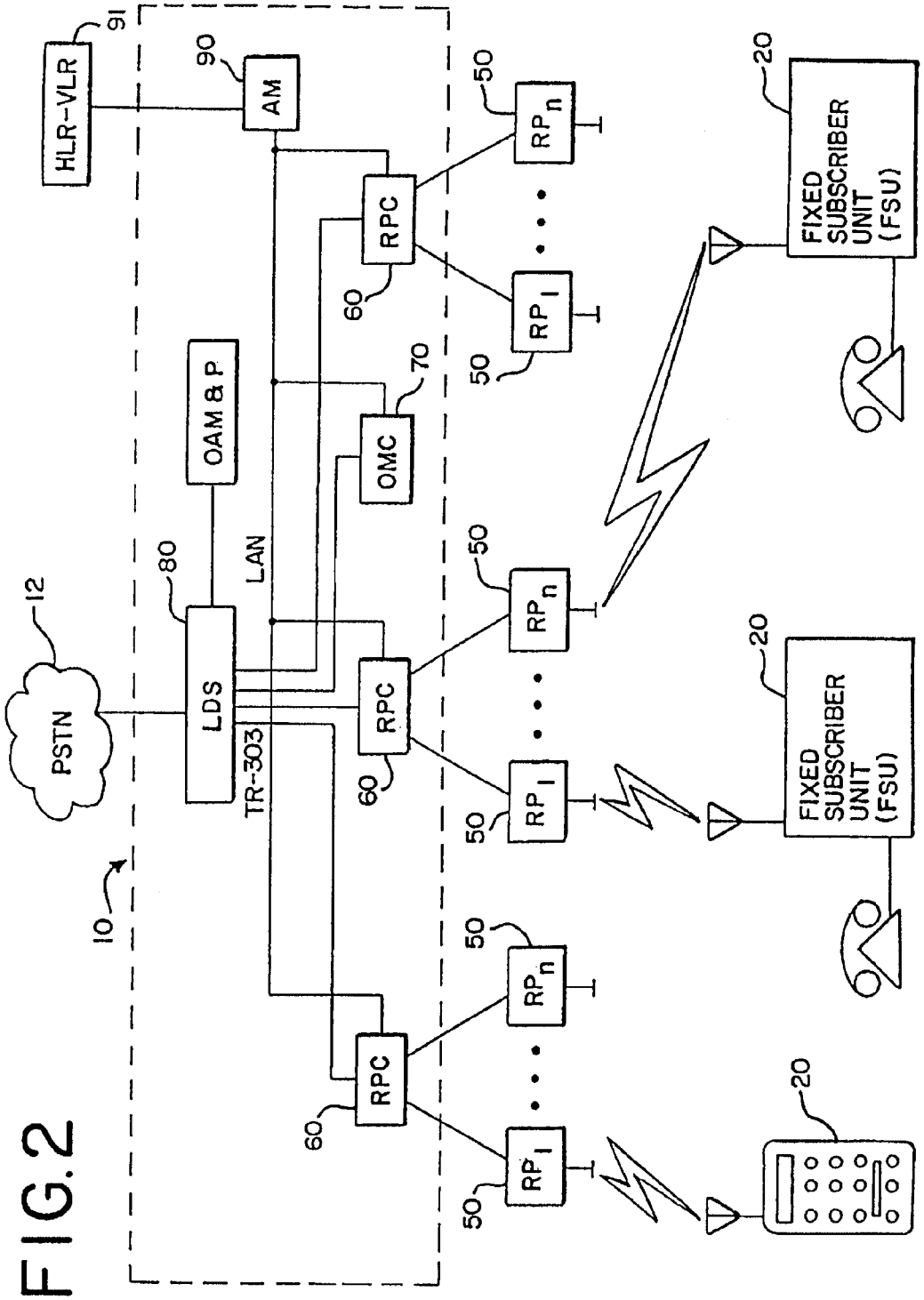
FIG. 2 is a block diagram of a wireless personal communication system.

FIG. 2 illustrates a general block diagram of a wireless personal communication system 10 that may be used for WACS or PACS. The system 10 includes subscriber units (SU) 20, transceiver units which may be radio ports (RP) 50, radio port control units (RPC) 60, an operations maintenance center (OMC) 70, a local digital switch (LDS) 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between one or more wireless systems 10 and the public switch telephone network (PSTN) 12. The AM 90 provides call control, communicates with the switch 80 to provide voice paths between the WACS/PACS network and the PSTN, and connects to a home location register-visitor location register (HLR-VLR) 91.

The SU 20 may be either a fixed subscriber unit or a portable subscriber unit. A fixed subscriber unit may be connected to an analog telephone by standard two (or more) wire analog telephone lines. The SU 20, fixed or portable, provides voice and data quality comparable to a wired system. A portable subscriber unit is similar to the fixed subscriber unit 20 but also includes a mouthpiece, an earpiece, and a user interface keypad. The portable subscriber unit 20, in one embodiment is similar to a cellular phone. In another embodiment, the portable SU 20 is functionally similar to a cordless phone. Unlike many cordless and cellular phones, however, the portable SU 20 digitally processes and filters all voice signals prior to broadcasting.

Subscriber units 20 provide wireless access for both voice and data information. An SU 20 may be located in the home or the office. Multiple SUs 20 may be in range of a single RP 50 and may be in broadcast range of each other. Unless otherwise indicated, the term subscriber unit (SU) applies to both the fixed and the portable versions in the following descriptions.

The portable SU 20 may be used in either low mobility, pedestrian environments or in higher mobility, automobile environments. In a high mobility environment, the RPC streamlines processing by sending some of the layer 2 messages from at least one of the DSPs in the STM instead of processing the message in the CAP. Also, the SU 20 may include a plurality and preferably two receive chains connected to the two antennas to assure optimum reception in a fast fading environment encountered during high vehicular mobility.

Figure 3:
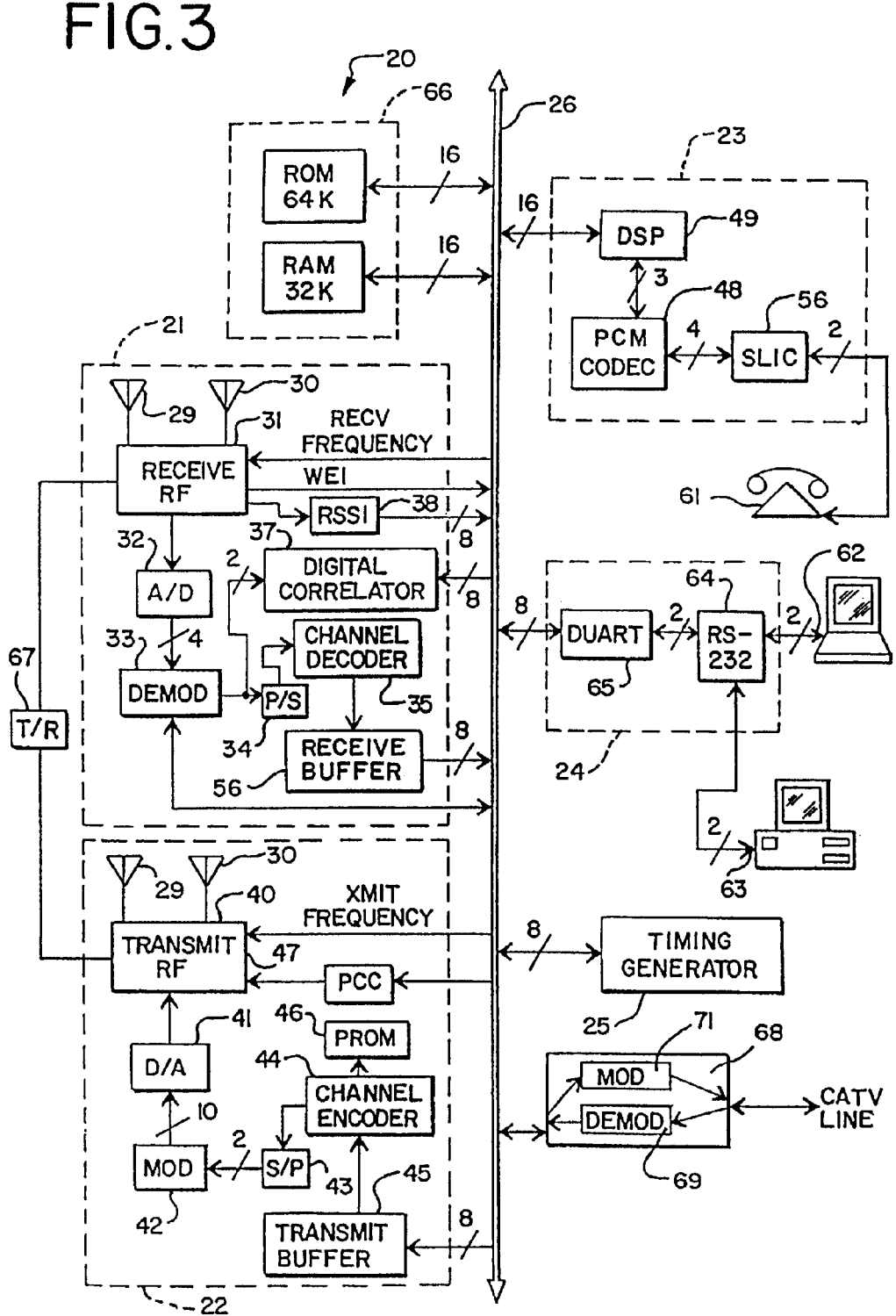
FIG. 3 is a block diagram of a subscriber unit that may be used in the system of FIG. 1.

Referring to FIG. 3, a preferred implementation of an SU 20 is shown in greater detail. The SU 20 has five connections to the outside environment: an RF receive antenna 30, an RF transmit antenna 29, a telephone connection 61, a data port 62, and a debug port 63. Internally, the subscriber SU 20 comprises an RF receive section 21, an RF transmit section 22, an analog port 23, a digital dataport 24, a timing generator 25, a memory section 66, and a databus 26 connecting all the internal blocks together.

The RF receive section 21 receives an RF input signal from the antenna 30. As shown in FIG. 3, there appear to be two antennas 29, 30 connected to the receive section 21. One antenna 29 is actually switched between the transmit and receive sections 21, 22 in standard WACS/PACS PCS. The RF section 21 recovers voice information from the RF signal in the form of a 32 kilobit per second (kbps) ADPCM signal. The RF section 21 also demodulates correlation information in the RF input signal. The received information, whether voice or data, is then placed on the databus 26. Conversely, the RF transmit section 22 receives voice or data information from the databus 26 and performs the function of transmitting voice or data information. Voice information is compressed to 32 kbps ADPCM and data information is simply modulated onto RF signals for transmission.

The analog port 23 receives analog information such as from an analog telephone and converts it to digital 32 kbps ADPCM for further processing and transmission over a radio link. Voice information arriving from the databus 26 in 32 kbps ADPCM form is converted to an analog signal and is communicated to a telephone connected to the port 23. The digital port 24 manages data signals sent to and from both the debug port 63 and the data port 62. The databus 26 is a data line connecting the various internal functions of the SU 20. Preferably, the databus 26 is a 16-bit wide communication line.

A standard two wire loop may connect the analog port 23 to a standard analog telephone. Analog voice signals picked up at the handset of the telephone will be converted in a subscriber line interface chip (SLIC) 56 from the two wire signal to a four wire signal. The four wire format voice signals are sampled and coded into a 64 kilobit per second mu-law pulse code modulated (PCM) signal by a PCM codec 48 in the SU 20. The digital signal is then processed in the digital signal processor (DSP) 49 which compresses the PCM signal into a 32 kbps ADPCM signal. In a portable SU the SLIC 56 is unnecessary because the voice signals are received from a mouthpiece attached to the portable SU. The same circuit board may be used for either portable or fixed applications. A switch or jumper may be used on the circuit board to designate the board's application. Alternatively, the board may be loaded without the SLIC 56 when a portable SU is desired. The universality of the circuit board design allows for cost savings to consumers and system operators.

In either type of SU, the DSP 49 sends the ADPCM signal along a databus 26 to the RF transmit section 22 where it enters a transmit buffer 45. The digital signal is temporarily stored in the transmit buffer 45 and then is transferred to the channel encoder 44. The channel encoder 44 encodes the digital signal with synchronization information in accordance with instructions stored in a programmable read only memory (PROM) 46 integrated circuit. The program stored in the PROM 46 is a decoding and encoding algorithm such as that disclosed in the Bellcore specification which anyone of ordinary skill in the art may program in to a PROM or other memory device. The encoded digital signal is transported through a serial-to-parallel (S/P) converter 43 to a modulator 42. The encoded signal is then converted from digital to analog in a digital-to-analog (D/A) converter 41 and transmitted from the transmit RF section 40 by an RF antenna 29.

Digital data signals originating at the digital input port 24 follow a different path. Initially, the signal coming in at a digital port 24 passes through an RS-232 connection 64 into a DUART device 65. The data information signal, unlike a voice signal, is not compressed into ADPCM format. The digital data signal is not processed in the PCM codec 48 or DSP 49. Instead, it proceeds along the same databus 26 as the voice signals and goes directly to the transmit buffer 45, the encoder 44 and then to the MOD 42 for modulation onto a carrier frequency.

After modulation, the signal (regardless of whether voice or data) is then converted to an RF signal approximately within the range of 1.8 to 2.2 GHz and transmitted from the RF transmit section 22 at an average power of approximately 10–20 milliwatts. The peak power transmitted is preferably no more than 200 milliwatts.

In standard WACS/PACS PCS, the output power of the RF transmit section 22 is controlled by a power control channel (PCC). The PCC can control the output power in steps of 0.75 dB +/−0.25 dB steps, with the total adjustment range being approximately 30 dB. A power controller 42 in the RF transmit section 22 of the SU 20 translates the power control instructions originating from the RPC 60.

Signals received by the SU 20 from a WACS/PACS PCS system first arrive at the RF antennas 29, 30 and are processed through a receive RF unit 31. The received analog signals are converted to digital form in an analog-to-digital (A/D) converter 32 and then demodulated in a demodulator 33. The demodulated wave form is then passed through a parallel-to-serial (P/S) converter 34, decoded in a channel decoder 35, and passed through a receive buffer 36. As part of the demodulation and decoding of the signal, the signal is also passed through a digital correlator 37 to analyze timing synchronization. The decoded signal in the receive buffer 36 then passes on to the databus 26 to the appropriate analog or digital port 23, 24 as determined by the DSP 49. Suitable parts for the A/D and D/A converters 32, 41 are a CXD1175AM-T6 A/D converter and a CXD1171-T6 D/A converter available from Sony Corporation. The Demod and Mod 33, 42 may be components as described in Bellcore specification.

Figure 4:
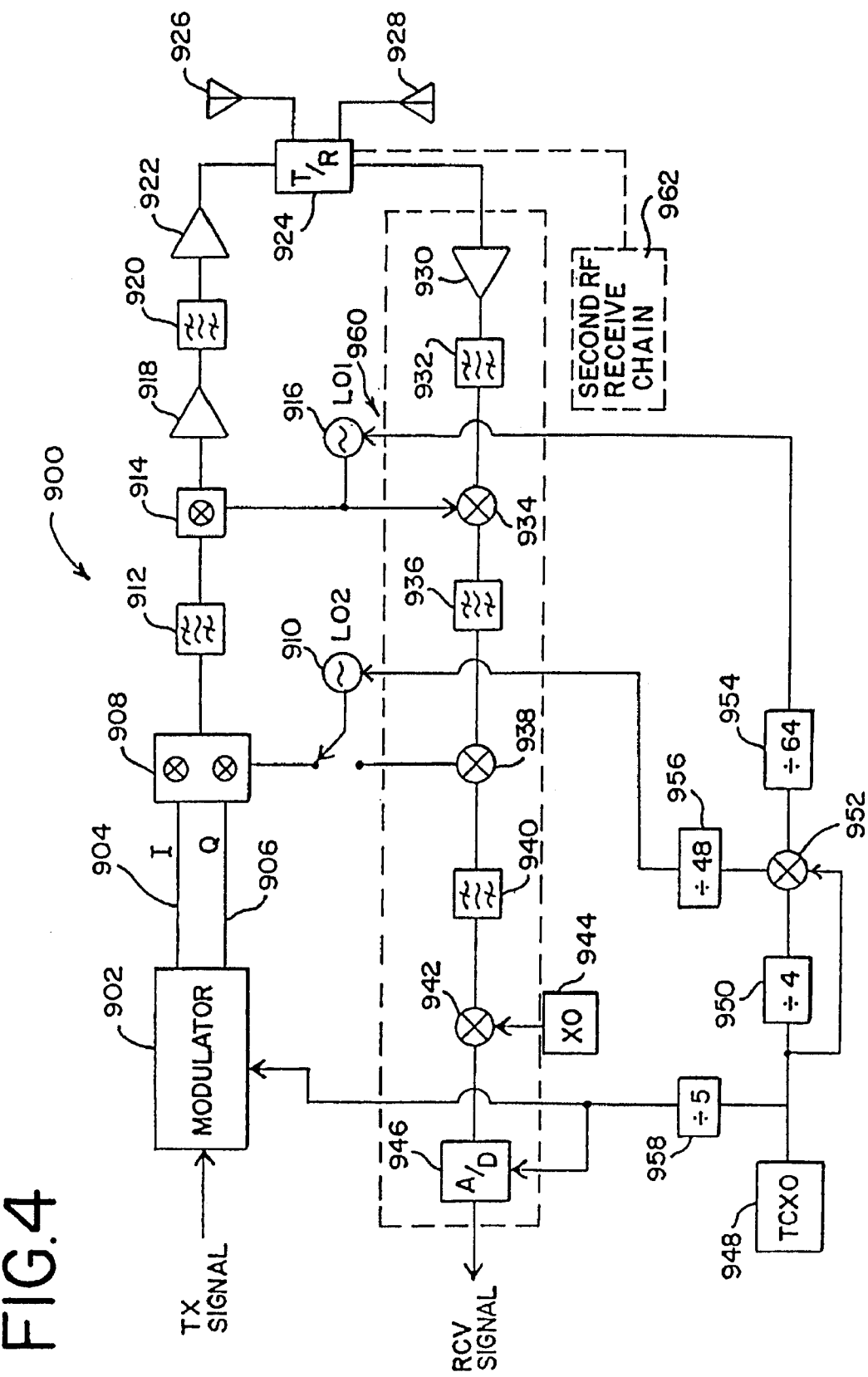
FIG. 4 is a block diagram of a RF section for a portable subscriber unit.

FIG. 4 shows a block diagram of one version of an RF transmit and receive section 900 for a portable SU. On the transmit (Tx) signal side, the RF section 900 has a modulator 902 that modulates the outgoing digital signal into I 904 and Q 906 lines which connect to a pair of I,Q mixers 908. The pair of I,Q mixers 908 utilize the reference frequency from a second local oscillator (LO2) 910 to mix the I and Q transmit signals 904, 906 to a first intermediate frequency (IF) transmit signal centered at 295.15 MHz for licensed band frequency transmissions. The first IF transmit signal is then filtered in a bandpass filter 912, such as a discrete circuit of inductors and capacitors centered at 295.15 MHz, before being mixed again in a mixer 914.

The mixer 914 receives the first IF transmit signal and a mixing frequency from a first local oscillator (LO1) 916. The LO1 is capable of producing frequencies in the range of 2.125 to 2.205 Ghz adjustable in 300 kHz steps. The first IF transmit signal is mixed to a higher,frequency second IF transmit signal in the mixer 914 in the range of 1.85 to 1.93 GHz. After mixing, the second IF is passed through a first gain stage 918, a bandpass filter 920 with a pass band of 1.85 to 1.93 GHz, and a second gain stage 922. Once the signal passes through the second gain stage 922, it proceeds through a transmit/receive (T/R) switch 924 that connects the signal to an uplink antenna 926 for broadcast over the airwaves.

Received signals in the range of 1.91 to 1.99 GHz arrive at both the uplink antenna 926 and the downlink antenna 928. The T/R switch 924 connects one of the antennas to the receive portion of the RF section 900. The received signal is first amplified in a gain stage 930, such as a low noise amplifier to control the noise figure, and is then passed through a bandpass filter 932 with a pass band of 1.91 to 1.99 GHz to a mixer 934. The mixer 934 mixes the received signal with a reference frequency generated by LO1 916 to create a first IF receive signal. A bandpass filter 936 centered at 215.15 MHz and connected to the mixer 934 filters the first IF receive signal.

The filtered first IF is then mixed in a second mixer 938 and downconverted to a second IF centered at 10.7 MHz. Another bandpass filter 940 filters the second IF and connects to a third mixer 942. The third mixer 942 down converts the second IF to a third IF, centered at 768 MHz, by mixing the second IF against a reference frequency. The reference frequency may be a 9.932 MHz signal generated by a crystal oscillator. The third IF continues on to an analog-to-digital (A/D) converter 946 and the rest of the SU circuitry for timing measurements and recovery of the voice or data information.

The RF transmit and receive section 900 is based on a frequency scheme determined by the reference oscillator 948 which is preferably a temperature controlled crystal oscillator (TCXO) set at 15.36 MHz. The TCXO 948 signal is passed through a divide-by-four (÷4) circuit 950 and connected to a mixer 952. The mixer 952, in one embodiment, may be an image rejection mixer. The mixer 952 receives the divided TCXO 948 signal and a signal directly from the TCXO 948. The mixer 952 mixes these frequencies to a higher frequency, of 19.2 Mhz. The 19.2 MHz reference frequency branches off into two paths. One path connects to a divide-by-48 (÷48) circuit 956 and the other path connects to a divide-by-64 (÷64) circuit 954. The ÷64 954 signal, preferably a 300 kHz signal, is connected to LO1 916. The ÷48 circuit 956 produces a 400 kHz signal and is connected to LO2 910. The TCXO signal also passes through a divide-by 5 (÷5) circuit 958 for use by the A/D converter 946 as a 3.072 MHz reference. Other frequency schemes may be used and the TCXO signal may be used to create reference frequencies to the rest of the SU.

The central processing unit managing the processes in the SU 20 is a digital signal processor (DSP) 49. A Texas Instruments TMS320C50 DSP chip is suitable. Other DSP chips, such as a TI TMS320C53 may also be used. The DSP 49 is used for both signal controls and performing the 32 kbps ADPCM speech encoding/decoding. The DSP 49 operates as a 16-bit parallel load processor utilizing a 16-bit wide data bus 26. The DSP 49 is driven by a clock frequency received from the RF transmit 22 and receive 21 sections. The clock frequency is approximately 16 MHz but higher or lower frequencies may be used.

The SU 20 may also include an application specific integrated circuit (ASIC) for performing the control functions of cyclic redundancy checking, general synchronization of incoming and outgoing signals, digital phase-locked loop. In addition, the compression/decompression of the signals may be completed by the ASIC. Referring again to FIG. 3, an ASIC may replace the channel decoder 35, channel encoder 44, digital correlator 37, and the DUART 65.

Two components in the SU 20 require the attention of the DSP 49. The DUART 65, which handles data flow, and the channel encoder/decoder 44, 35, which is preferably a single chip such as a Xilinx XC4005-6PQ208C, both generate interrupts to indicate that there is incoming data or that the component is ready for more data. The channel encoder/decoder 44, 35 generates two separate interrupts; one for encoding and one for decoding.

Figure 5:
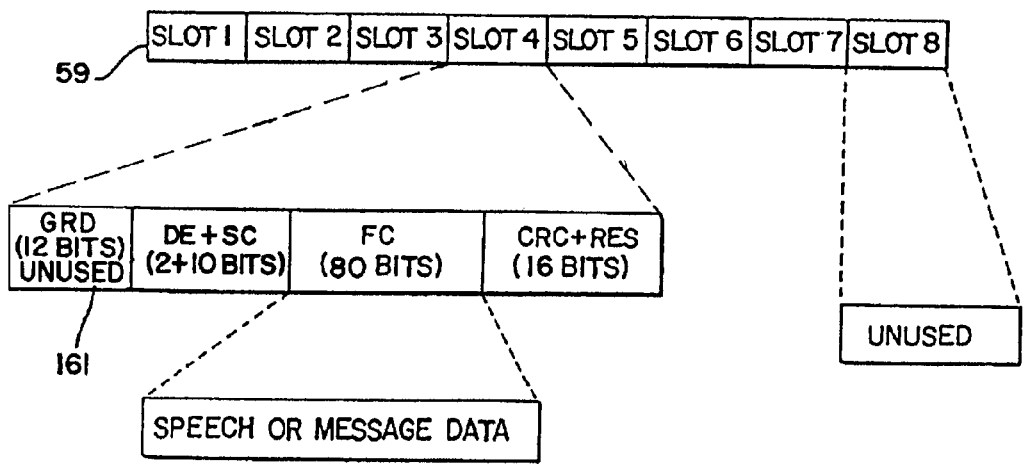
FIG. 5 is an illustration of a preferred message format sent by the subscriber unit of FIG. 2.

In standard WACS/PACS PCS, the SU 20 employs a time division multiple access (TDMA) method of communicating digital information to a radio port 50. As best seen in FIG. 5, the formatted information transmitted from the SU 20 to the RP 50 is arranged in eight time slot frames 59, each time slot 161 comprising 120 bits of information. The SU 20 broadcasts information onto one of the time slots 161 in radio transmission bursts to the RP 50. A particular RF frequency can carry one frame 59 of information. The SU 20 can sweep in frequency for available time slots in a frame 59.

Each 120 bit burst of information lasts approximately 312.5 microseconds (2.5 milliseconds/8 timeslots) and is synchronized such that the burst always corresponds with an appropriate time slot 161 that the SU 20 reserved for the particular transmission. Each time slot 161 of the transmitted message frame 59 carries information necessary to synchronize the SUs 20 transmission burst. Each TDMA burst from an SU 20 contains several information fields: guard band (GRD), differential encoding (DE), slow channel (SC), fast channel (FC), cyclic redundancy check (CRC), and a reserved bit (RES). The FC contains the speech or data transmitted from the SU 20 to the RP 50. The CRC information is computed at the SU 20 and used to compare against CRC data computed in the RP 50 for error detection or correction.

Figure 6:
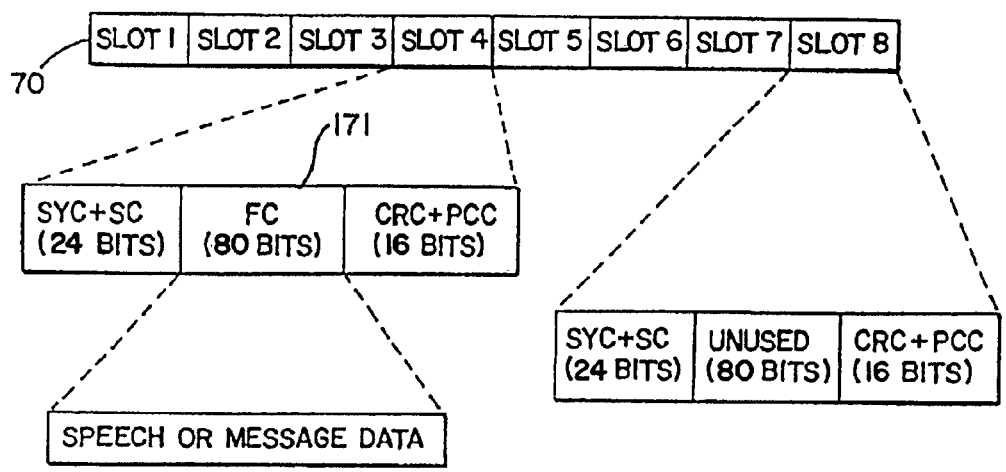
FIG. 6 is an illustration of a message format sent by a radio port.

FIG. 6 depicts the standard formatted information received by an SU 20. An RP 50 transmits voice or data information to an SU in time division multiplex (TDM) format. TDM transmissions are continuous radio transmissions as opposed to the TDMA bursts. Again the SU 20 is allocated to a specific 120 bit time slot 171 in a frame 70. The time slot 171 includes a synchronization pattern (SYC), a slow channel (SC), a fast channel (FC) containing the speech or data transmitted from the RP 50, a cyclic redundancy code (CRC), and power control channel (PCC) information. The SYC and SC information comprise a 24 bit message that the SU 20 uses to synchronize with the RP 50. Synchronization and correlation are performed by the Xilinx chip. The CRC represents data computed at the RPC 60 useful for determining errors in transmission.

The channel encoder 44, such as a XC4005-6PQ208C from Xilinx at 2100 Logic Drive, San Jose, Calif. 95124-3400, preferably encodes a digital voice signal with the proper digital correlation information. The encoded signal is then modulated preferably using quadrature amplitude modulation (QAM) in WACS, or π/4 differential quadrature phase shift keying (DQPSK) in PACS, with a raised-cosine spectral shaping filter.

Figure 7:
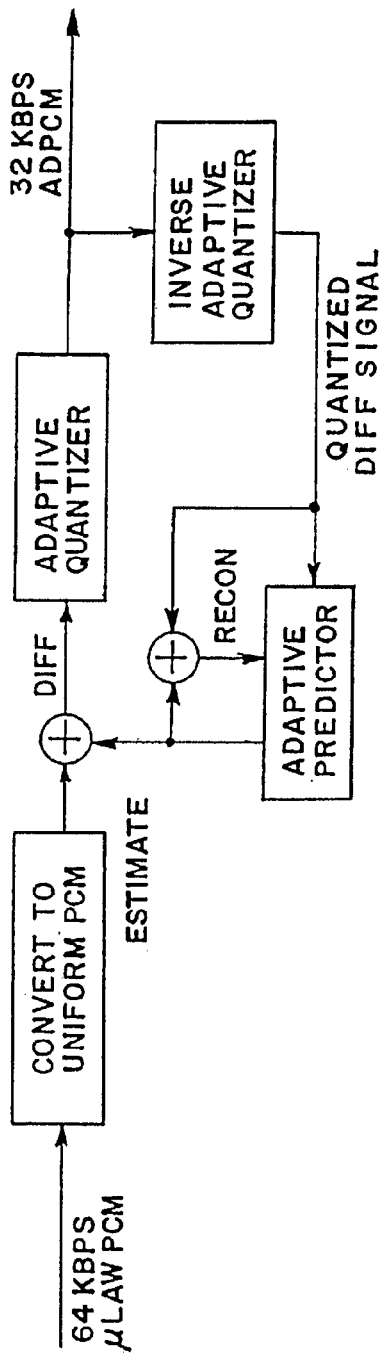
FIG. 7 is a functional block diagram of an encoder in the subscriber unit of FIG. 2.

As seen in FIG. 7, one method of encoding voice data generated at the SU 20 is to take the 64 kbps mu-law PCM signal created at the PCM Codec 48 and encode the information into 32 kbps ADPCM. The DSP 49 performs the encoding. The encoding is based on the CCITT Recommendation G.721 standard algorithm. The encoding process begins by converting the mu-law PCM to uniform PCM. After conversion to uniform PCM, a difference signal is obtained by subtracting an estimate of the input signal from the input signal itself. An adaptive quantizer is used to assign four bits to the value of the difference signal per sample. An inverse quantizer produces a quantized difference signal from these four bits. The signal estimate is added to this quantized difference signal to produce the reconstructed version of the input signal. Both the reconstructed signal and the quantized difference signal are operated on by an adaptive predictor which produces the estimate of the input signal, thereby completing the feedback loop.

Figure 8:
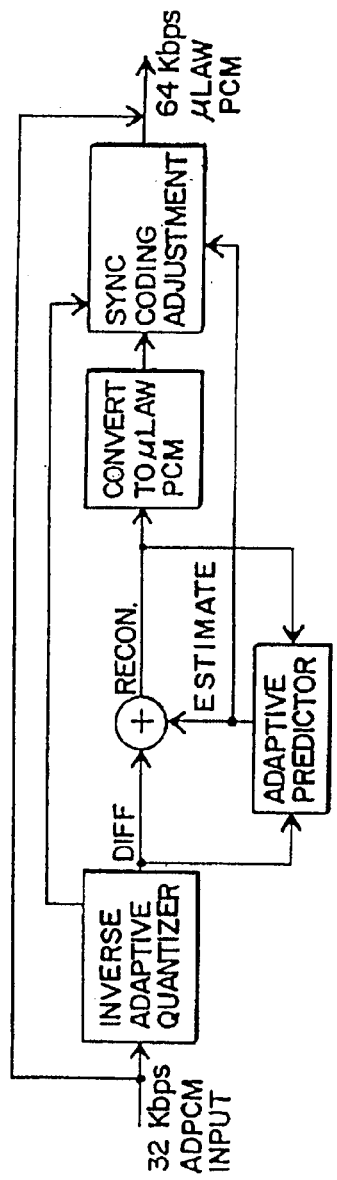
FIG. 8 is a functional block diagram of a decoder in the subscriber unit of FIG. 2.

Voice signals received on the antennas 29, 30 (FIG. 3) are 32 kbps ADPCM signals modulated on RF frequencies. The signals must be demodulated, converted to 64 kbps mu-law PCM in the DSP, and sent to the PCM Codec 48 for conversion into analog signals. The decoding, as illustrated in the functional block diagram of FIG. 8, is performed in a functional structure similar to the feedback portion of the encoder algorithm together with a uniform PCM to mu-law PCM conversion and a synchronous coding adjustment. The adjustment prevents cumulative distortion on synchronous tandem codings.

In standard WACS/PACS PCS, the radio port (RP) 50 performs the basic function of transmitting and receiving voice and data information between the SU 20 and the RPC 60. The RP 50 exchanges information with one or more SUs 20 over a radio link at RF frequencies, in the range of 1.8 to 2.2 GHz. The RP 50 may exchange information with a single RPC 60 over a standard T1 transmission line. In addition, one or more RPs 50 may communicate with the RPC 60 over a DS1 interface, a high bit-rate subscriber line (HDSL) interface, or T1 interface methods.

Additionally, the RP 50–RPC 60 interface may be a microwave, optical, or cable television line interface. The RPs 50 may be configured to utilize existing CATV cabling for RP 50–RPC 60 communication (or RP to RP communications in alternative configurations discussed herein). Existing unused bandwidth in the return band of the frequency division multiplexed television signals may be used on the CATV cabling. The CATV downstream and upstream signals are preferably frequency division multiplexed with the RPC to RP data signals and RP 50 to RPC 60 data signals respectively. The cable television return band is approximately 5 to 50 MHz. Both voice and data information may be sent in either direction along any of the RP-RPC (or RP-RP) interfaces. At higher data rates, video telephone calls having both audio and video components may be transmitted along these interfaces.

An RP 50 is less expensive to manufacture and easier to use than a base transceiver system in a cellular network. Typically, an RP 50 is mounted onto an existing telephone pole or the side of a building. RPs 50 do not perform any special per-call processing on signals, such as subscriber registration or authentication, and may therefore be inexpensively produced.

Figure 9:
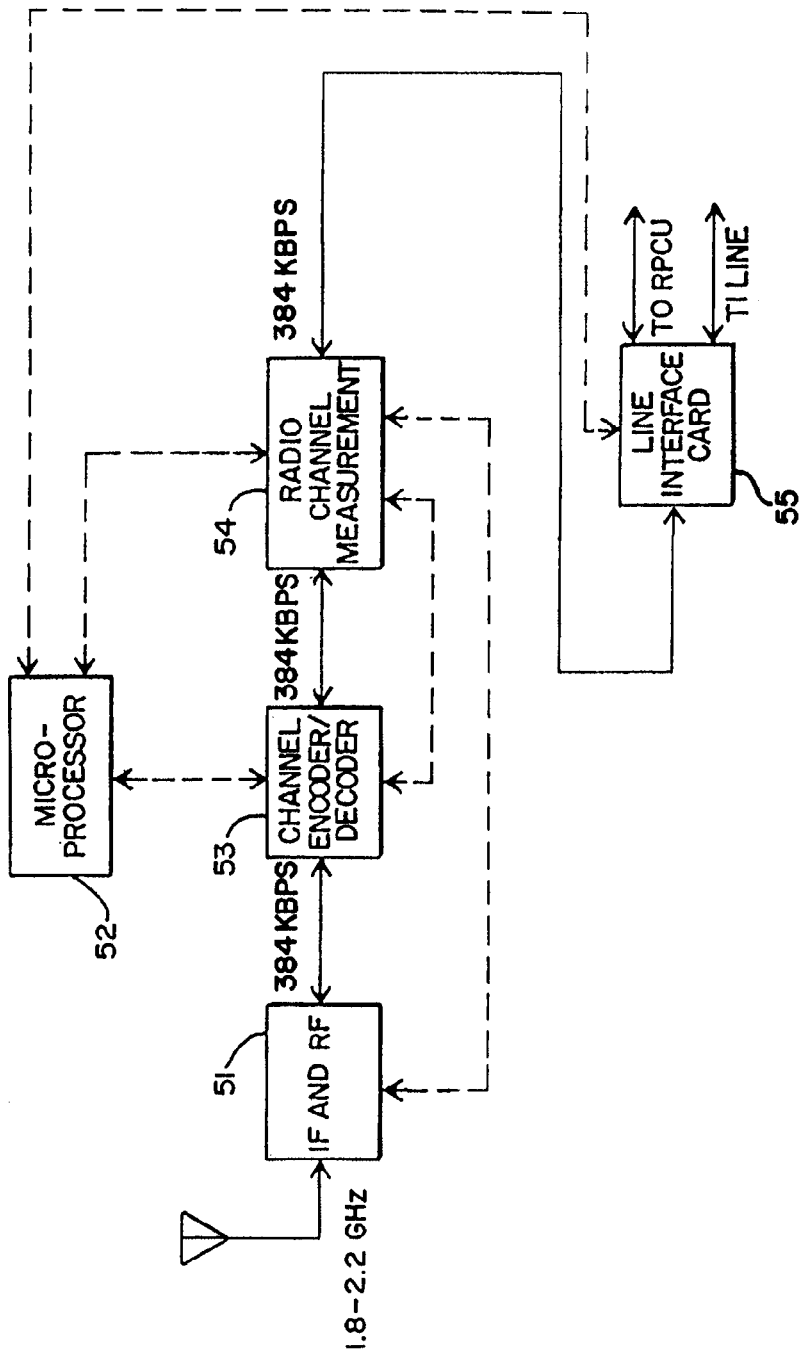
FIG. 9 is a functional block diagram of a radio port that may be used in the system of the present invention.

FIG. 9 best shows a functional block diagram of a basic RP 50. The RP 50 generally performs several functions including: transmission/reception of the radio frequency signals, channel coding/decoding of signals for synchronization with the network, and general performance measurements. The RP 50 contains an IF and RF section 51 receiving and transmitting information signals at RF frequencies over an antenna or antennas. Received RF signals at the IF and RF section 51 are downconverted to a 384 kilobits per second (kbps) data stream and sent to the channel encoder/decoder 53 function block. Although 384 kbps is shown, other data rates are equally suitable, such as the 400 kbps rate used in WACS. The channel encoder/decoder 53 function is controlled by a microprocessor 52. The channel encoder/decoder 53 function involves managing the timing of signals arriving and leaving the RP 50. The microprocessor function 52 manages the formation received from an RPC is encoded into 32 kbps ADPCM for transmission to an SU 20.

The basic RP 50 also performs radio channel measurements measuring the performance of SUs 20 and the RP 50. Controlled by the microprocessor 52, the radio channel measurement 54 is made and information is sent to the RPC for processing with each burst. Voice and data signals broadcast over a radio link at RF. frequencies are received at the RP 50. The RF frequencies are downconverted from the RF frequencies to a 384 kbps data stream in order to recover the information in the signal. The 384 kbps data stream is decoded, processed through a radio channel measurement unit 54 and then sent through a line interface card 55 for transmission over a T1 line connected to an RPC. The decoded information received from an SU 20 and sent on to the T1 line is in a 64 kbps PCM format. Conversely, signals received from the RPC are processed first through a line interface card 55 controlled by a microprocessor 52 and then encoded and converted to RF frequencies for transmission to an SU 20.

Figure 10:
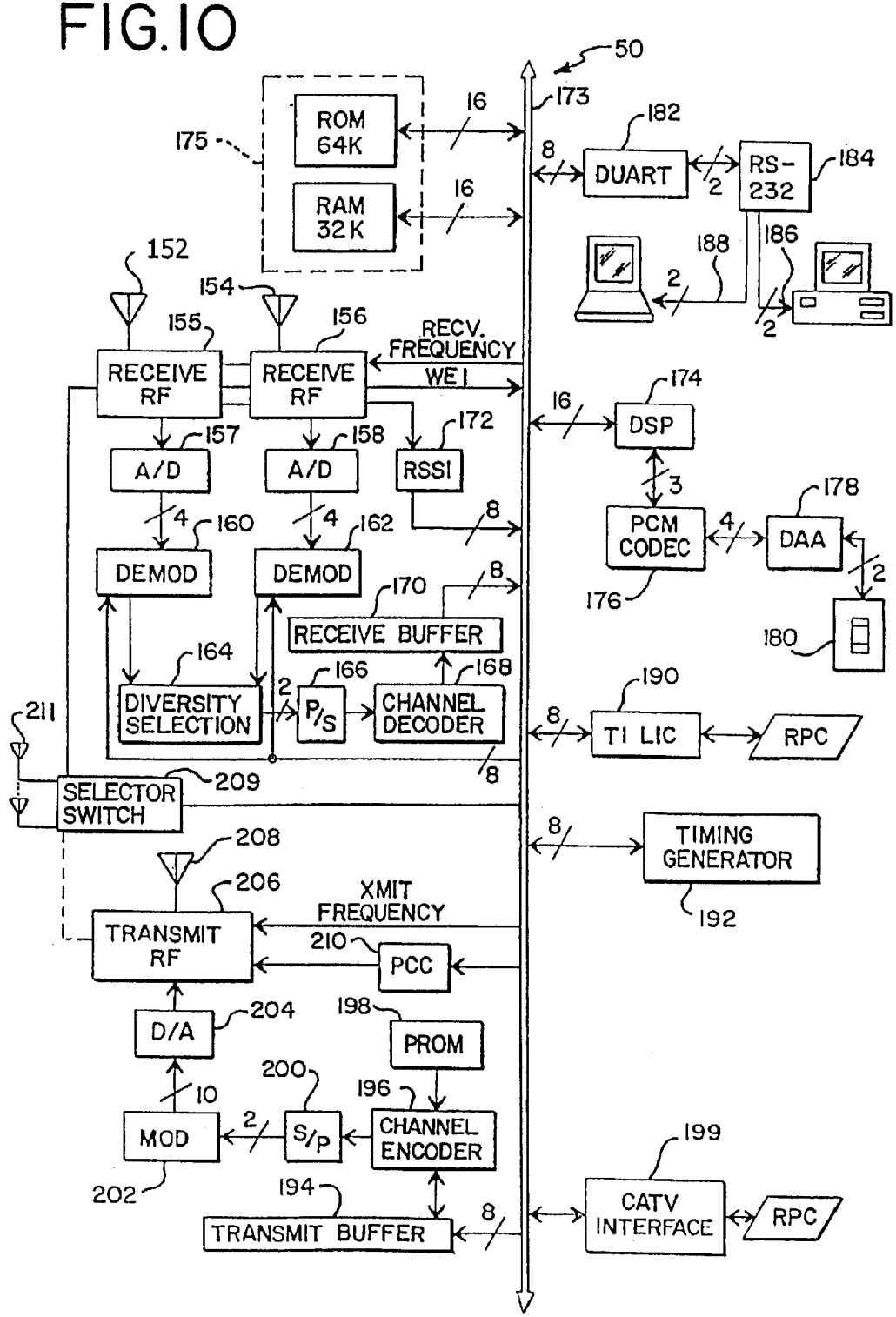
FIG. 10 is a block diagram of a radio port.

FIG. 10 illustrates the RP 50 in more detail. The RP 50 receives RF frequency signals from one or more SUs 20 on a pair of spatially diverse antennas 152, 154. The RP 50 is tuned to receive a particular frequency by the digital signal processor 174, such as a TMS320C53. The received signal from the SU 20 is then downconverted in the receive RF sections 155, 156 respectively attached to the spatially diverse antennas 152, 154. Each receive RF section 155, 156 downconverts the same frequency and channels the downconverted signal to an analog-to-digital (A/D) converter 157, 158 respectively attached to the receive RF sections 155, 156. The A/D converters 157, 158 may be 8 bit, 20 Megasample per second A/D converters such as a CXD1175AM-T6 manufactured by Sony Corporation. The digital signals are transferred to modem demodulators 160, 162, which may be implemented as a Xilinx XC4005 or Xilinx 4013 chip. Once the digital signals have been demodulated in the demodulating sections 160, 162 they are compared in a diversity selector 164.

A type of antenna diversity selection is described in standard WACS/PACS PCS that helps to produce the strongest signal possible in the radio port 50. At the diversity selector 164, that may be implemented with a Xilinx 4005 or Xilinx 4013 chip, the different RF downconverted signals demodulated in the demodulators 160, 162 are compared to find the best signal of the two that have been downconverted. Other forms of selection diversity may alternatively be employed such as known ratio combining or equal combining techniques. Ratio combining involves taking the better portions of each signal and combining the two portions to reconstruct the best signal. Equal combining requires taking equal amounts of both signals received on the antennas 152, 154 and combining them. Because the antennas 152, 154 are spatially diverse from one another, the RP 50 is more likely to receive a stronger signal. The antennas are positioned spatially and angularly diverse, and most preferably orthogonal, to one another.

Following reception and downconversion of the RF frequencies and diversity selection, the signal is then processed through a parallel-to-serial (P/S) converter 166 and input in serial format to a channel decoder 168. The channel decoder 168 decodes the correlation information. The channel decoder 168 may comprise a Xilinx XC4005-6PQ208C chip. Information decoded in the channel decoder 168 is then forwarded to a receive buffer 170 prior to being sent on a databus 173 to a destination determined by the digital signal processor 174. Voice information is transmitted along the databus 173 to the DSP 174. The DSP 174 decodes the 32 kbps ADPCM to 64 kbps PCM. The PCM Codec 176 receives the 64 kbps mu-law PCM and decodes it into an analog signal. The analog signal is then processed in a Data Access Arrangement (DAA) 178 for transmission along telephone lines.

If the information placed onto the databus 173 is data information, the data information is then directed by the DSP 174 to the appropriate dataports 188, 186. The dataports 188, 186 are connected to the databus 173 via a DUART which translates the information into an asynchronous serial input/output form that is then handed to an RS-232 port 184. Alternatively, if the information placed on the databus 173 is intended for processing through a WACS/PACS network, then the information is routed through a T1 transport 190, which may comprise an AT&T 1711SA chip, that interfaces with an RPC 60. When the RP 50 is connected to an RPC (or other RP) via existing CATV lines, the T1 transport 190 is replaced with a transport capable of modulating/demodulating the information up to the 5–50 MHz band available on the CATV line.

Voice information received from the telephone lines or the RPC 60 is transferred along the databus 173 to the transmit buffer 194 in preparation for encoding in a channel encoder 196. The channel encoder may be a Xilinx XC4005-6PQ208C chip. The encoder 196 may be programmed with an algorithm, such as is disclosed in the Bellcore specification, in firmware installed in a PROM 198. The RP 50 also has a memory block 175 for extra program storage capability. The channel encoder 196 encodes the received 32 kbps ADPCM signal with information regarding timing and synchronization. The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 20. For transmission of data where no encoding is necessary the encoder 196 and S/P converter 200 are bypassed and the databus 173 is directly connected to the modulator 202. This decision may be controlled by digital signal processor (DSP) 174.

Another feature contained in the RP 50 is power control in connection with a subscriber unit 20. The radio port 50 collects data on received signal strength using a received signal strength indicator (RSSI) 172. The RSSI 172 is located on the RF receive portion of the RP 50. Also a word error indication bit (WEI) is received from an SU 20 and transferred through the DSP 174 to the RPC 60.

Generally, the RP 50 transmits a time division multiplex (TDM) transmission with 8 time slots. The RP 50 uses one of the time slots as a system broadcast channel (SBC) for reference by the SU 20 in synchronizing frames transmitted. Just as the SU 20 transmits into one of the 8 slots in bursts, the RP 50 transmits on all 8 slots. When transmitting, the RP 50 synchronizes with the rest of the system 10 using a timing generator 192 which operates at 384 kbps (in PACS applications). The timing aspects of the eight slot message 70 transmitted by the RP 50 is important both because information sent from an SU 20 must be synchronized to fit into the proper slot in a frame and because information transmitted to the RP 50 and then onto T1 lines must be synchronous with time slots available and expected by the system 10. As mentioned above, one format for the interface between the RP 50 and the RPC is DS1 over a T1 line. Similar to the time slots in the eight slot message transmitted between SU 20 and RP 50, the T1 line connected to the RPC 60 also has DS1 time slots which must be synchronized with the information.

Referring again to FIG. 6, formatted information transmitted via RF frequencies from the RP 50 to the SU 20 is illustrated. The SBC time slot contains 120 bits as do the other 7 time slots (all slots contain 100 bits in WACS). However, the 80 bit fast channel (FC) in the SBC is unused.

As best shown in FIG. 11, the RP 300 may be configured as a hybrid RP/RPC to process calls in a stand-alone system or between SUs 301, 303 in an intercom mode. When one SU 301 wishes to communicate with another SU 303 within range of a common RP, the RP 300 can connect the calls directly and avoid involving an RPC. The RP 300 may have two RF receive chains 302, 304 communicating with at least two antennas 306 through a switch 308. The RP 300 also includes a memory buffer 310 and a switching device for managing the information communicated over a first channel from a first SU 301 and information communicated on a second channel from a second SU 303. The channels may be TDMA time slots and the switching device 312 may be a time slot interchange unit (TSI).

In order to minimize hardware complexity, the DSP 174 (FIG. 10) in the RP may function as the time slot interchange unit. The DSP may shift voice and data communications between the specific SUs 301, 303 into and out of existing memory buffers in the RP. The memory buffer 310 for temporarily storing the information between bursts may be excess space in the memory block 175 RAM or extra storage space on a Xilinx XC4005-6PQ208C, or similar, programmable logic array chip. Incoming information from a first SU and destined for a second SU in communication with a RP is first removed from the appropriate time slot and put in a buffer. The DSP then removes the information from the buffer and routes it for transmission to the second SU in the appropriate outgoing time slot.

The RP 300 may also have an interface section 314 connected to the TSI 312 for communicating with the PSTN directly, another RP, or an RPC using T1, CATV or other communications links as described above.

Referring again to FIG. 1, advanced two way messaging services are provided by the system 400 according to the preferred embodiment. Each LRP 410 handles transmission of pages to users of a wireless system, such as PACS users, outside the coverage area of a conventional system of microcells but within the messaging service areas 406. In the forward direction, the network sends a page addressing the personal transceiver unit, preferably a subscriber unit. The page includes a service field that advises the user of whether the call which is waiting at the network is a voice call. In the return direction, from the personal transceiver unit 408 to the LRP 410, an acknowledgment will always be returned. This acknowledgment will indicate whether (1) the page has been received at the personal transceiver unit and (2) whether the user has read the page and selected from option keys which permit a user to deliver up to ten numeric and alpha numeric characters back to the fixed transceiver unit. In another preferred embodiment, the user has the option to choose to transfer the call to a predetermined location, such as a home or office, by pressing pre-encoded buttons on the personal transceiver handset. The user may also forward the call to any convenient cellular or land-line telephone by entering the telephone number for that phone into the portable transceiver unit. Many other options, such as a "do not disturb" button that forwards all calls to a voicemail system may be implemented.

The LRP 410, as shown in FIG. 1, is preferably a radio port as described above (see FIGS. 9 and 10) that has been adapted to be mounted at a higher elevation and use the same power output as the RPs in the voice communication areas. Alternatively, the power output of LRPs may be increased to, for example, compensate for specific terrain difficulties. In one embodiment, the LRPs may be mounted 100 to 200 feet off of the ground. These mounting structures may be similar to existing cellular antenna towers. By mounting the LRPs at a higher elevation than RPs 412, the broadcast range is increased. The LRPs 410 preferably cover a range equivalent to a standard cellular transmission radius of about 10 to 20 miles. RPs in a PACS voice network would be typically installed on poles at between 20 to 50 feet and higher. Each RP preferably provides a voice service area having a radius of 0.25 to 1 mile.

The LRPs, in one embodiment, use a combination of transmission techniques to increase the energy per bit transmitted $(E_b)$ and thereby improve transmission range. The transmission techniques include transmitting at a lower effective bit rate. Other transmission techniques which may be used are a high gain forward error correction (FEC) technique and a repetition scheme which permits the decorrelation of fading in time. By combining these techniques, a 30 dB increase in effective received power per bit is achieved.

The LRPs 410 preferably use a single 300 kHz channel that is one of the sixteen channels already allocated for use in PACS. This 300 kHz channel is dedicated to LRPs and is shared by all the LRPs in the same system. The single channel sharing between the LRPs implements the same cellular concept of cluster reuse. In one preferred embodiment, there are twelve LRPs in a cluster. Within a cluster, the same channel is reused through a loosely synchronized TDMA scheme where each LRP uses $\frac{1}{12}$ of a frame.

As best seen in FIG. 12, the LRP transmissions are formatted in a six second frame 420, each LRP having one of twelve 500 millisecond timeslots 422 in that frame. The term "loosely synchronized" refers to the few milliseconds of leeway used to avoid overlapping the transmissions between LRPs. Within each of the time slots 422 of an LRP frame 420, each LRP uses a continuous TDM stream to transport the LRP information to an SU. Within the 500 millisecond timeslot there is preferably 25 milliseconds of guard time 423 and 475 milliseconds of continuous TDM transmission 424. The guard time is preferably a period of unused time where no information is transmitted to allow for potential delays and timing errors between transmissions (time slots) from different LRPs.

In one preferred embodiment, the continuous TDM transmission portion 424 of each LRP timeslot 422 is broken down into five 95 millisecond subframes 425. The subframes 425 each contain a 12 bit synchronization pattern (SYNC) that permits a personal transceiver unit to synchronize with the LRP. A transmit identification (TX ID) consisting of 4 bits is also included in each subframe 425. Each LRP has a unique TX ID and the 4 bits permits all twelve LRPs in a cluster to be individually identified.

Eighteen messages 426 of five milliseconds each preferably follow the SYNC and TX ID bits. In one embodiment each message 426 corresponds to a specific page directed to a specific personal transceiver unit. The messages 426 in a subframe 425 may be configured to repeat the same message twice within a subframe such that a total of nine paging messages can be transmitted in the forward direction. The repetition of messages in a subframe can be varied to accommodate system specific bit error and transmission requirements. By repeating messages in a subframe, the transmission range of an LRP may be increased by raising the effective energy per bit without having to increase LRP transmit power.

Using the LRP framing of this embodiment, a particular LRP may page once every 6 seconds. The LRP, during its 500 millisecond time slot, continuously repeats its message until acknowledged by the appropriate SU. An acknowledgment message from a personal transceiver unit, such as a PACS subscriber unit, may be received at any time during the 500 millisecond time slot allotted a particular LRP.

In operation, the LRP receives instructions to page a SU 408 outside the voice service area 404 of the system 400 once the SU has been located. When a SU is operating within a voice service area of a PACS system the SU is registered in the system and receives an alert phase and alert value when a call is incoming. Additionally, the LRP channel for that region in which the SU is operating is sent over the system broadcast channel (SBC).

Figure 13:
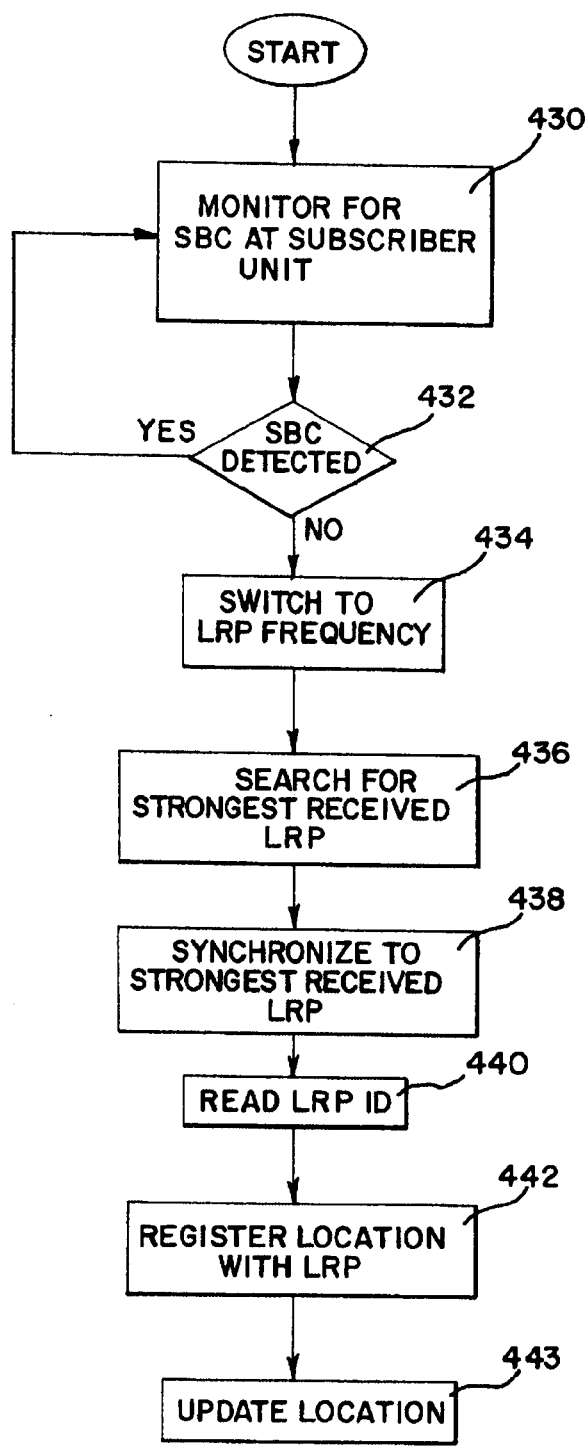
FIG. 13 is a flow chart showing a preferred method of registering a personal transceiver.

When a SU moves away from the voice service area, the SU loses the alerting channel as well as any system broadcast channel (SBC) in conventional PACS. As shown in FIG. 13, the SU monitors 430 the SBC. If it is unable to find 432 any SBC, the SU switches 434 to the LRP channel and tries to synchronize a forward LRP transmission. The SU first searches 436 for the strongest received LRP signal and synchronizes 438 itself to the particular transmitter having the strongest transmission period. The SU then reads 440 the transmitter ID for the LRP in the cluster. Preferably, the transmitter ID is a 4 bit code. After successfully selecting one LRP transmitter in the cluster, the SU registers 442 its location with the LRP at a particular transmitter. As the SU moves within separate spheres of coverage for LRPs it continuously updates 443 its location with the LRP at specified predetermined intervals. The interval for updating may simply be every time a personal transceiver unit moves out of range of an LRP or at a fixed time.

An LRP uses the same modulation scheme, transmission rate and transmission frame structure of PACS in a preferred embodiment. In PACS, the modulation scheme is $\pi/4$ DQPSK, the transmission rate is 384 kilobits per second, and the information frames are 2.5 millisecond frames having 8 timeslots. Each frame 428 in PACS carries 120 bits of information. An LRP transmits at a much lower bit rate, as mentioned above, in order to maximize effective power. Each of the eight timeslots in a 2.5 millisecond PACS frame 428, usually used to carry 120 bits of voice information, is used to transmit 1 bit of an LRP message.

As shown in FIG. 12, the five millisecond messages 426 have 16 timeslots each. In one preferred embodiment, the 16 timeslots 427 (each carrying one bit of information) are divided so that 12 bits are personal transceiver address bits and 4 bits carry the message destined for the personal transceiver unit.

Figure 14:
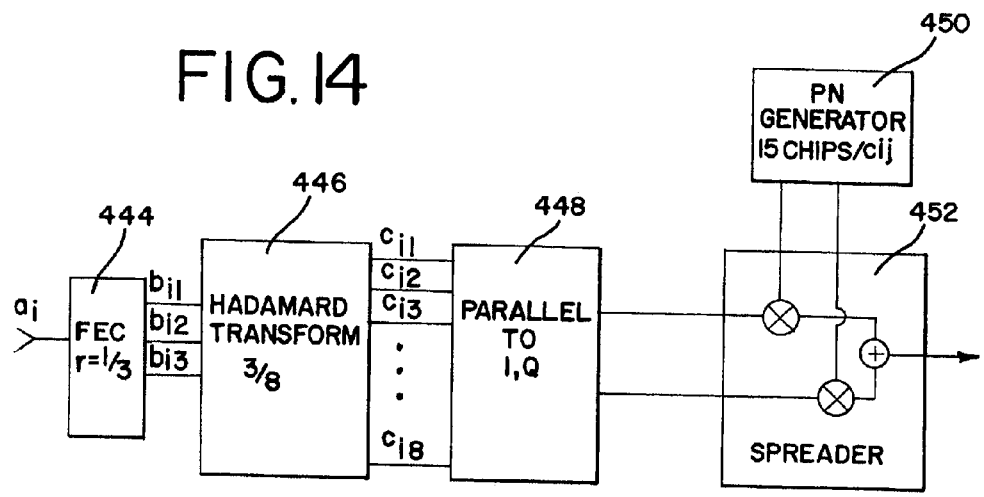
FIG. 14 is a block diagram of a bit spreader for use in a long range pager.

As shown in FIG. 14, the spreading of the 1 LRP bit over the 120 available transmitted bits per slot is achieved by combining two coding schemes with a spreading technique. Preferably, the coding schemes are r=$\frac{1}{3}$ FEC and Hadamard transform combined with a real spreading of 15 chips per Hadamard encoded bit.

FIG. 14 shows a block diagram of the LRP transmitter. A forward error correcting encoder (FEC) 444 provides three output bits for each information bit (r=$\frac{1}{3}$) with a block encoding scheme. The three bits at the output of the FEC are used to select a 8-arg ($2^3$) coded word from an orthogonal code as represented by the Hadamard transform block 446. After transform coding, each information bit is converted into 8 coded bits that are converted into two serial streams in the parallel-to-IQ converter 448. The I and Q stream containing the same coded information are further spread in the spreader 452 by two pseudo-random (PN) sequences with a length of 15 ($2^4-1$) chips per coded bit generated in the PN Generator 450. The spreader 452 is followed by the same $\pi/4$ DQPSK modulator used in PACS.

Figure 15:
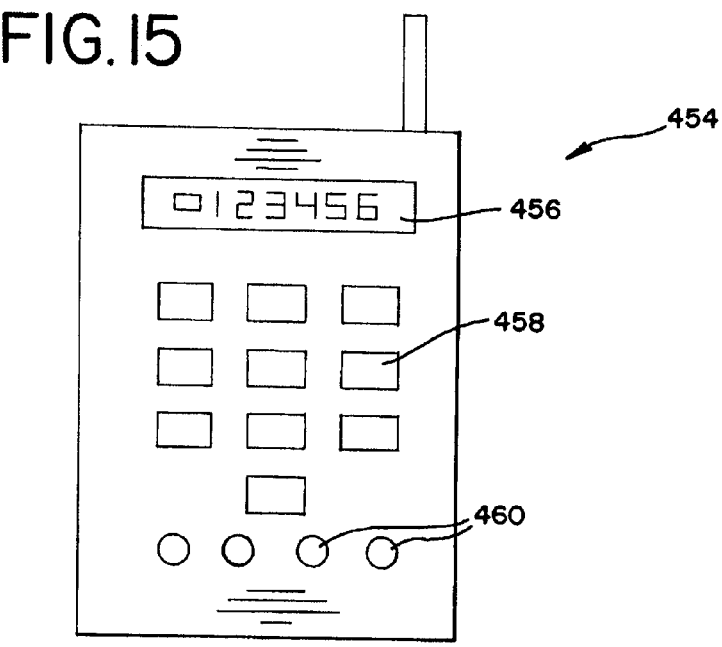
FIG. 15 is a front view of a personal transceiver with integrated two way messaging and voice features.

Once a page is received by an SU 408, the user is alerted to the incoming call. As shown in FIG. 15, the two way messaging feature is preferably integrated into the SU 454. A display 456 presents alphanumeric information on caller identification received from an LRP. The user may then direct the incoming call to a phone that is convenient to the user. By responding to the page via the alphanumeric keypad 458 on the SU 454, the user may enter the phone number of the nearest telephone. This information is relayed through the LRP back to the RPC 414 and switch 416. The SU may have preset keys 460 which are preprogrammed to direct the incoming call to specific destinations such as home, to another wireless system, or to an answering service. Again, the SU preferably broadcasts over existing PACS frequencies and message frame structures to the LRP which relays the information to a switch via the RPC.

In the return transmission link, as shown in FIG. 16, the SU preferably transmits continuous bursts to the LRP using a sequence of 2.5 msec frames 462. These frames, as in the PACS standard, are transmitted at 384 Kbps with $\pi/4$ DQPSK modulation, and are equivalent to an aggregation of 8 time slots. The transmission of burst in the return link is scheduled to avoid collisions in the return link. The scheduling of retransmissions on the return channel is related to the order in which the terminals receive their messages in the forward direction.

Every burst transmitted in the return direction (SU to LRP) consists of a synchronization field 464, message length field 466, alphanumeric message 468, and Cyclic Redundancy Check (CRC) field 470. The alphanumeric message 468 may be of variable length (L), where L is the number of octets (8 bit information segments) in the message 468. Preferably, the message length field 466 contains the value of L. Each octet is transmitted in a 2.5 msec frame containing eight slots with 120 transmitted bits per slot. A 120 bit slot carries one information bit.

The 120 transmitted bits in each slot are generated with each information bit using the same combination of encoding (FEC and Hadamard transform) and spreading used in the forward link. This encoding and spreading scheme is preferably implemented in DSP-based firmware that may be incorporated in existing or added memory in an SU. In another embodiment, the SU may be modified to include conventional channel coder electronics commonly used in the industry. Additional details on FEC, Hadamard transforms, and other commonly known encoding and spreading methods may be found in the text of Error Correcting Codes by W. Wesley Peterson published by the MIT Press.

In another preferred embodiment, a user may respond to a page with a brief voice message. In this embodiment, the user speaks into an SU 454 in response to a page and the SU digitizes the voice message for transmission to the caller. Because of the lower bit rate in two way messaging service areas 406, the digitized replies to a page must be brief and regenerated by a synthesized voice or a vocoder to the caller.

From the foregoing, a system and method of implementing advanced messaging in an existing wide area wireless PCS system has been shown. LRPs carrying paging messages and returning responses from personal transceiver units are described. A format and protocol for incorporating the messaging into existing frequencies and framing has also been described.

It is intended that the foregoing detailed description be regarded as illustrative rather than limiting, and that it be understood that the following claims, including all equivalents, are intended to define the scope of this invention.

What is claimed is:

1. A personal access communications system for implementing full two way voice and data service in a voice service area and two way messaging in areas outside the voice service area, the personal access communications system comprising:

a plurality of radio ports for implementing the full two way voice and data service in the voice service area, the radio ports transmitting voice and data signals on a first communication channel;

at least one portable transceiver unit adapted to receive and transmit voice and data in addition to receiving and responding to paging signals; and a plurality of long range pagers for transmitting and receiving paging signals wherein the paging signals are integrated into the voice and data transmission format of the personal communication system, the long range pagers defining a paging service area outside of the voice service area wherein the long range pagers share a second communication channel different from the first communication channel.

2. The system of claim 1 wherein the portable transceiver unit receives pages from the long range pagers over a predetermined TDM frequency.

3. The system of claim 2 wherein the predetermined TDM frequency is a PACS format TDM frequency.

4. The system of claim 2 wherein the predetermined TDM frequency is configured having 12 time slots in a 6 second frame.

5. The system of claim 4 wherein each time slot is approximately 500 milliseconds and comprises an approximately 25 millisecond guard band and an approximately 475 millisecond information band.

6. The system of claim 5 wherein the approximately 475 millisecond information band comprises a plurality of approximately 95 millisecond messages.

7. The system of claim 1 wherein the portable transceiver unit responds to pages from the long range pagers over a return transmission link at a predetermined frequency using TDMA.

8. The system of claim 7 wherein the predetermined TDM frequency is a PACS format TDM frequency.

9. The system of claim 8 wherein the predetermined TDM frequency is configured to carry a variable length alphanumeric message.

10. The system of claim 9 wherein the variable length alphanumeric message comprises at least one eight bit information segment.

11. The system of claim 10 wherein each eight bit information segment is transmitted in a 2.5 millisecond frame.

12. A wide area wireless personal communication system incorporating advanced messaging capability comprising:

at least one short range transceiver having an operating range defining a voice service area for providing voice and data communication to a user having a personal transceiver unit, the at least one short range transceiver operating on a first communication channel;

a two way messaging service area for providing advanced messaging services to users via a plurality of long range pagers, the long range pagers operating on a second communication channel different from the first communication channel, the long range pagers sharing the second communication channel.

13. The system of claim 12 wherein the wireless personal communication system is a PACS standard system and twelve long range pagers share a single 300 kHz channel.

14. The system of claim 12 wherein at least one of the long range pagers incorporates a transmitter comprising:

a forward error correction encoder in communication with a Hadamard transform encoder;

said Hadamard transform encoder in communication with a parallel-to-IQ converter; and a bit spreader coupled to a pseudo-random number generator for receiving an I and a Q serial information stream from the parallel-to-IQ converter.

15. A method of registering a personal transceiver unit in a two way messaging service area of a wireless personal communications system comprising the steps of:

monitoring a SBC broadcast in a voice service area with the personal transceiver unit;

switching to a predetermined paging frequency if no SBC is detected;

acquiring a long range pager broadcasting on said paging frequency by (a) searching for a strongest received long range pager signal; (b) synchronizing the transceiver unit to a long range pager having the strongest signal, and (c) reading a transmitter ID for the long range pager having the strongest signal; and registering a location of the personal transceiver unit with the wireless personal communications system via the long range pager.

16. The method of claim 15 wherein the predetermined paging frequency is an existing frequency used in the wireless system.

17. The method of claim 16 wherein the long range pager ID is a four bit code.

18. The method of claim 15 further comprising the step of continuously updating the location of the personal transceiver with a long range pager at specified predetermined intervals as the personal transceiver moves through different broadcast spheres of other long range pagers.

* * * * *